United States Patent Office 3,149,885
Patented Sept. 22, 1964

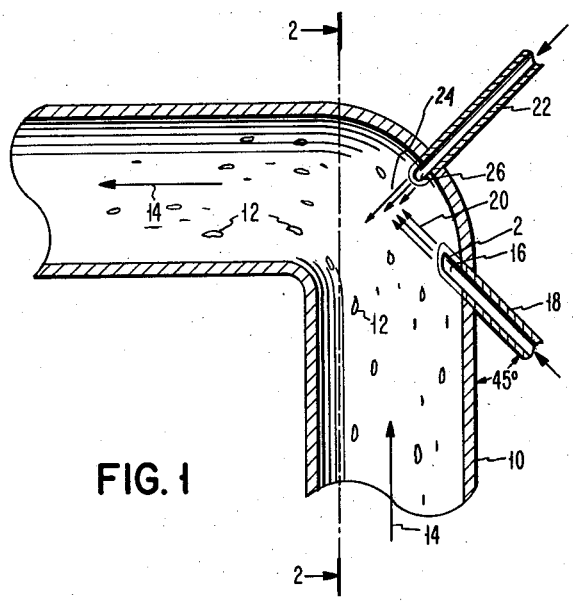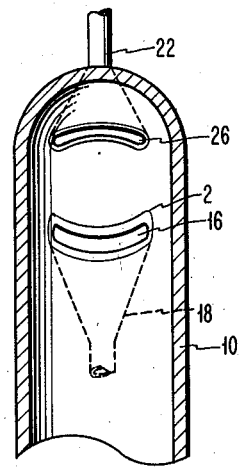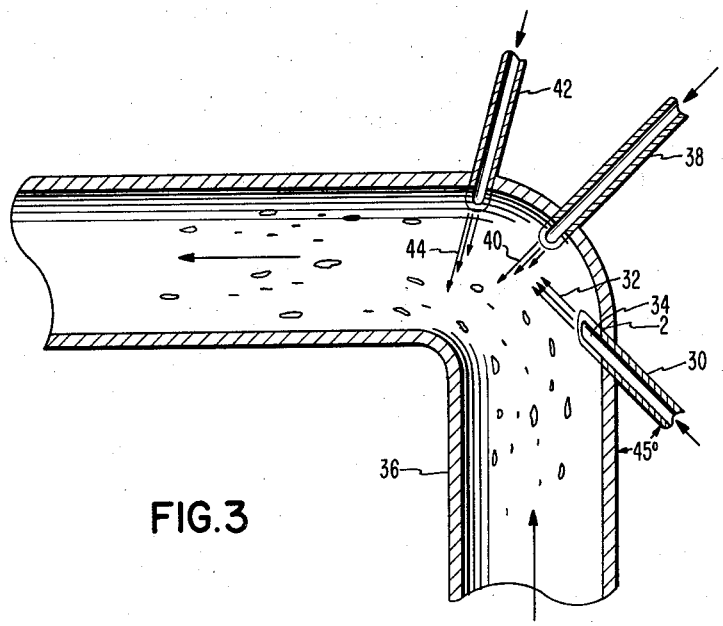
FIG. 1
FIG. 2
FIG. 3
INVENTOR.
THOMAS B. WALSH
ATTORNEY Sept. 22, 1964    T. B. WALSH    3,149,885
CONDUIT FOR CONVEYING SOLIDS IN A STREAM OF FLUID
Filed Jan. 21, 1963    2 Sheets-Sheet 2

3,149,885
CONDUIT FOR CONVEYING SOLIDS IN A
STREAM OF FLUID
Thomas B. Walsh, 7856 Sterling Drive, Oakland, Calif.
Filed Jan. 21, 1963, Ser. No. 252,720
7 Claims. (Cl. 302—64)

The present invention relates to apparatus for conveying solids, such as gravel, coke, catalysts or grain entrained in a stream of gaseous or liquid fluid that is blown, or sucked, through tubular conduits by the action of pumps or blowers. In practical use of such apparatus, it is frequently desirable that the direction of conveyance be changed abruptly in order to convey the solids along the shortest possible path around obstructions to an intended destination. To keep the conveyed solids in suspension in the stream of fluid and to reduce the time of travel to the intended destination, the stream of fluid has to advance at very considerable speeds, such as 10,000 feet per minute. This throws the entrained solids with great force against the side of greater radius of a bent conduit section, which causes abrasion and erosion of the conduit and severely shortens the useful life thereof necessitating frequent repairs and replacements of the affected conduit sections. Additionally, it causes frequently undesirable disintegration of the conveyed solids as they are thrown against the rigid conduit walls. It has therefore been necessary in the past to make any bends in the conduits of large radii. This, however, increases the size and cost of the equipment, frequently requires more space for such installations then may be conveniently available and only partially reduces the abrasion and erosion and undesirable disintegration.

Furthermore, whenever there is the requirement for repair or replacement there is the attendant loss or escape of materials conveyed and the complete shut-down of the operation until the repairs or replacements have been made.

It is an object of my invention, therefore, to provide an arrangement whereby solids conveyed at great speed in a stream of liquid or gaseous fluid may be conducted around sharp corners in the conduits without eroding the walls thereof and without being disintegrated in the process.

Further objects are to provide a construction of maximum simplicity, economy and ease of assembly and disassembly, also such further objects, advantages and capabilities as will fully appear and as are inherently possessed by the device and invention described herein.

The invention further resides in the combination, construction and arrangement of parts illustrated in the accompanying drawings, and while there is shown therein a preferred embodiment thereof, it is to be understood that the same is illustrative of the invention and that the invention is capable of modification and change and comprehends other details of construction without departing from the spirit thereof or the scope of the appended claims.

In the drawings:

FIGURE 1 is a section through a bent conduit section constructed in accordance with my invention;

FIGURE 2 is a section taken along line 2—2 of FIGURE 1 and viewed in the direction of the arrows associated with said line;

FIGURE 3 is a section, similar to FIGURE 1, illustrating a modified embodiment of my invention.

Figure 4A:
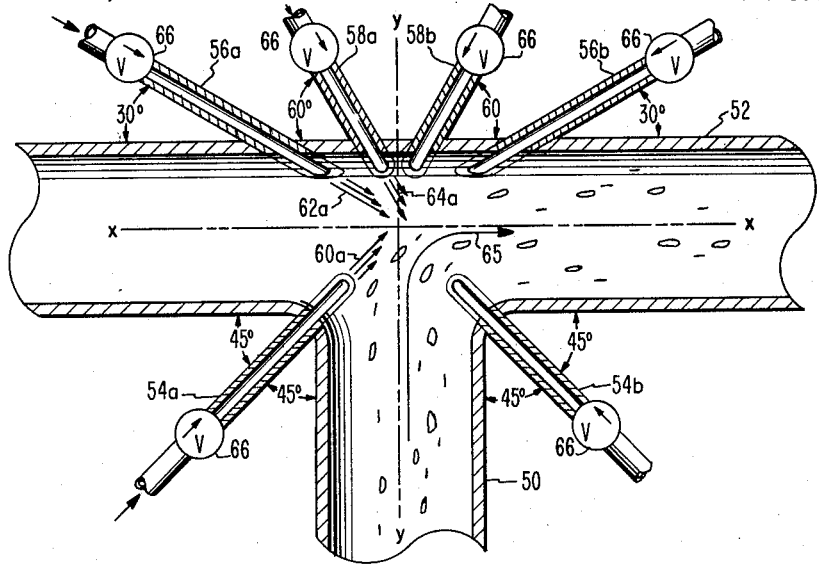
FIGURES 4A and 4B are sections illustrating different operational conditions of yet another embodiment of my invention.

In accordance with the invention I inject into the conduit at the point where the bend commences (as viewed in the direction of conveyance of the solids through the conduit) a first jet of fluid in the direction of a chord extending across the inner surface of the wall portion of maximum radius, and at the same time I inject a second jet of fluid into the conduit from a point in the region of the apex of the bend in a direction substantially radially thereof. Practical tests have shown that jets located as described inhibit erosion of the wall of bent conduits and reduce disintegration of the conveyed solids to a minimum so that it is now possible without detriment to the conduits or the conveyed solids, to conduct solids in a stream of fluid around sharp bends, with resultant savings in the size, cost, and operational expense of such conveying equipment.

FIGURE 1 illustrates a longitudinal section through a tubular conduit 10 of metal or plastic which is bent at an angle of 90° and through which granular solids indicated at 12 are conveyed in the direction of the arrows 14 by a stream of air that is blown or sucked through the conduit. This would normally cause severe erosion and eventually perforation of the outer portion of the conduit wall at and beyond the bend. In accordance with the invention I provide a slot 16 into the wall of the conduit extending over about 90° of its circumference, on the outside of hte bend in about the region where the bend commences, and I inject through said slot by means of an inclined nozzle 18 a jet of air that is directed across the bent portion of the conduit in the manner of a chord as indicated at 20; and by means of another nozzle 22 I inject a second jet of air 24 into the conduit in a direction radially of the bend through another slot 26 that may likewise extend over about 90° of the circumference of the conduit and which is located in the region of the apex of the bend. The quantity of air injected into the conduit by the nozzles 18 and 22 is small compared with the stream of air blown or sucked through the conduit for conveyance of the solids. However, for best performance the jet of air directed into the conduit through nozzle 18 should preferably enter the conduit at a greater speed than the speed of the stream of air which conveys the solids through the conduit. For instance, in operating a practical embodiment of my invention gravel was conveyed through a tubular conduit having a diameter of 6 inches by air sucked through the conduit in quantities of 20,000 cubic feet per minute at a speed of 10,000 feet per minute; and to avoid erosion of the tube at a bend like the bend illustrated by FIGURES 1 and 2, 150 cubic feet of air was injected into the conduit through the nozzle 18 at a speed of 12,000 feet per minute while 75 cubic feet of air was injected into the conduit through nozzle 22 at a speed of only about 6,000 feet per minute. To test the effectiveness of the arrangement of the invention, the inner surface of the bend and an adjoining part of the subsequent straight run of the conduit were coated with paint, and even after hours of continued operation no significant deterioration of the coat of paint could be observed. I am not certain which occurrences produced by the jets in the interior of the bent conduit are responsible for this remarkable result, but tests have proven beyond any doubt that the jet 20 by itself is not sufficient to enable the solids to negotiate the bend without destroying the conduit and disintegrating in the process. The presence of a second radially directed jet injected at or near the apex of the bend is essential for satisfactory performance of the arrangement.

The embodiment of the invention illustrated in FIGURE 3 is of particular advantage in cases where heavy materials are to be moved by streams of fluid. It differs from the embodiment of the invention illustrated in FIGURE 1 by employing an added radially directed jet of fluid for protecting the bend and the adjoining part of the subsequent straight run of the conduit from destructive impingement by the solids suspended in the fluid stream. It comprises a first injection nozzle 30 that directs a jet of fluid 32 through an aperture 34 in the wall of the conduit 36 in the region where the bend commences, at an angle of about 45° relative to the vertical run of the conduit in the manner of a chord across the bend of the conduit. In the region of the apex of the bend another nozzle 38 is arranged to inject a second jet of fluid 40 in a direction substantially radially of the bend into the interior of the conduit. In addition, a third nozzle 42 is arranged to direct a third jet of fluid 44 at a point near the end of the bend into the interior of the conduit in a direction that extends likewise radially of the curvature of the bend. As in the embodiment illustrated in FIGURES 1 and 2, the velocity with which fluid is injected into the conduit through the first nozzle 30 should preferably exceed the velocity with which the suspended solids are conveyed through the conduit 36, while the speed of the jets of fluid injected through the radially directed nozzles 38 and 42 is not critical and may be below the speed of travel of the conveyed solids.

Figure 4B:
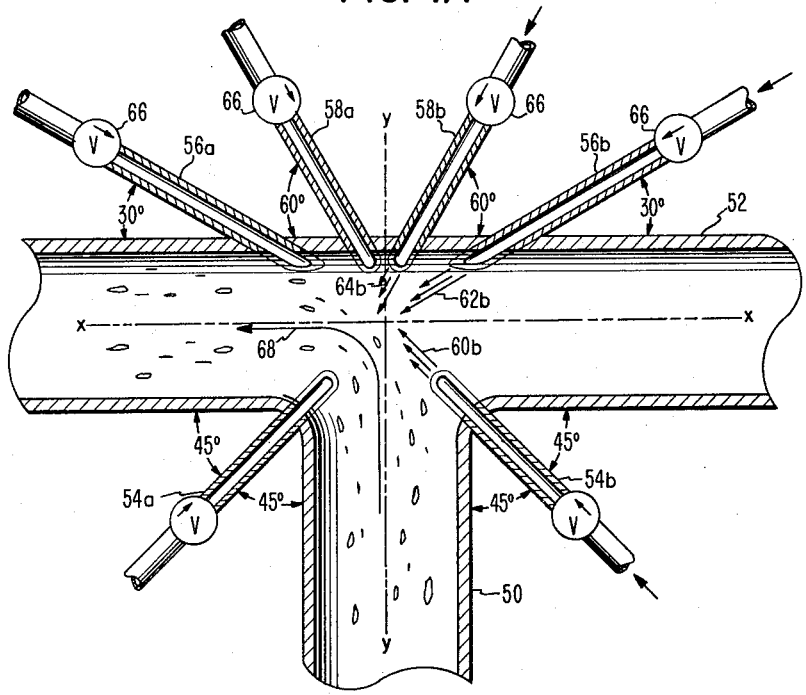

FIGURES 4A and 4B illustrate the manner in which the principles of my invention may be applied to a T-joint, and may be employed to direct a conveying stream of fluid loaded with solids, that arrives along the stem portion of the T-joint, selectively into the left or right portion of the cross bar of the T-joint while protecting the walls of the joint from injury by impingement of the solids conveyed in the fluid stream.

When a stream of fluid carrying solids entrained therein arrives at the juncture area of the T-joint along the stem portion 50 thereof, it may be turned into the right portion of the cross bar 52 without injury to the walls of the cross bar by injecting jets of fluid into the juncture area through nozzles 54a, 56a and 58a as illustrated in FIGURE 4A. The first nozzle 54a which corresponds in location and effect to the nozzles 18 and 30 of the embodiments illustrated in FIGURES 1 and 3, respectively, is located in the left corner of the T-joint formed by the stem and the cross bar portion thereof at an inclination of about 45° relative to either of said portions. It is arranged to inject a jet of fluid 60a diagonally across the juncture area of the joint in the plane defined by the center axes y and x of the tubular components 50 and 52 of the joint. The second nozzle 56a is arranged to inject a jet of fluid 62a into the cross bar portion 52 of the joint in the direction toward the right half thereof. It is introduced at a point of said cross bar portion opposite to the injection point of nozzle 54a and at an angle of about 30° relative to said cross bar portion 52. The third nozzle 58a is arranged to inject a third jet of fluid 64a into the juncture area of the joint at an angle of about 60° relative to the cross bar portion 52 near the point where the center axis y of the stem portion 50 intersects the wall of the cross bar portion, i.e., slightly to the left thereof, as illustrated in FIGURE 4A. When all three nozzles 54a, 56a and 58a are in operation, the main stream of fluid arriving through the stem portion 50 and the solids entrained therein are turned to the right as indicated by the arrow 65 and pass into the right portion of the cross bar 52 without destructive impingement upon the wall of said cross bar or other guidance means.

A symmetrically identical nozzle arrangement is provided on the right side of the T-joint to turn a stream of fluid carrying solids suspended therein into the left side of its cross bar portion 52. This arrangement comprises a first nozzle 54b arranged in the right corner of the T-joint to inject a jet of fluid 60b (FIGURE 4B) into the juncture area thereof in a direction diagonally of said area. A second nozzle 56b at the far side of the cross bar portion is slanted at an angle of about 30° relative to said cross bar portion and is arranged to inject a jet of fluid 62b into said cross bar portion in the direction toward the left side thereof from a point opposite the injection point of nozzle 54b. A third nozzle 58b is arranged to inject a third jet of fluid 64b at or near the point of intersection of the center axis y of the stem portion 50 with the outer wall of the cross bar portion 52 at an angle of about 60° toward the left corner of the T-joint. To operate the proper set of nozzles, each of them may be provided with a suitable control valve represented by the circles 66 in FIGURES 4A and 4B. When the right array of nozzles 54b, 56b and 58b is in operation and the left set of valves 66 is closed a stream of fluid loaded with solids, even when arriving at very high speeds, is dependably turned to the left as indicated by the arrow 68 in FIGURE 4B without eroding the remote side of the cross bar portion 52, and without disintegration of the solids caused by impact against the conduit walls.

While I have described my invention with the aid of certain preferred embodiments thereof, it will be understood that the invention is not limited to the specific constructional details shown and described nor to the velocities and quantities of the fluids mentioned by way of example, all of which may be departed from without departing from the scope and spirit of the invention. It should particularly be understood that while I have illustrated my invention as employing air as the fluid conveying medium, the principles of the invention will operate with other gaseous or liquid fluids, such as water. Also, the principles of my invention will operate whether the fluid medium carrying the solids is driven through the conduits by suction or propulsion.

I claim:

1. Arrangement for inhibiting erosion of a bent portion of a conduit carrying a main stream of fluid with solids entrained therein comprising a nozzle arranged to inject a jet of fluid into the conduit at the beginning of the bend in the direction of a chord extending across said bend and a second nozzle arranged to inject a jet of fluid into the conduit from a point in the region of the apex of said bend in a direction radially thereof.

2. Arrangement according to claim 1 wherein said first nozzle is arranged to inject its jet of fluid into the conduit at a higher velocity than the velocity of the main stream passing through said conduit.

3. Arrangement for inhibiting erosion of a bent portion of a conduit carrying a main stream of fluid with solids suspended therein comprising a first nozzle arranged to inject a jet of fluid into the conduit at a point near the beginning of the bend in the direction of a chord extending across said bend, a second nozzle arranged to inject a jet of fluid into the conduit from a point near the apex of said bend in a direction diagonally of said bend, and a third nozzle arranged to inject a jet of fluid into the conduit at a point near the end of the bend in a direction radially of said bend.

4. Arrangement according to claim 3 wherein said first nozzle is arranged to inject its jet of fluid into the conduit at a velocity greater than the velocity of the main stream passing through the conduit.

5. Arrangement for selectively turning a main stream of fluid having solids entrained therein in opposite directions while inhibiting erosion of the conduit carrying said stream comprising a tubular T-joint having a stem portion for receiving said main stream and a cross bar portion extending to the right and to the left of said stem portion; means operable to direct said main stream into the right part of said cross bar portion including a first nozzle operable to inject a jet of fluid from the left corner of said T-joint into the juncture area thereof in a direction diagonally of said area, and a second nozzle operable to inject a jet of fluid from a point on the left side of said cross bar portion opposite the injection point of said first nozzle at an acute angle in the direction toward the right side of said cross bar portion, and means operable to direct said main stream into the left side of said cross bar portion including a third nozzle operable to inject a jet of fluid from the right corner of said T-joint into the juncture area thereof in a direction diagonally of said area, and a fourth nozzle operable to direct a jet of fluid from a point on the right side of said cross bar portion opposite to the injection point of said third nozzle at an acute angle in the direction of the left side of said cross bar portion.

6. Arrangement according to claim 5 wherein said first and third nozzles are arranged to inject fluid into the juncture area of said T-joint at a higher velocity than the velocity of said main stream.

7. Arrangement for selectively turning a main stream of fluid having solids entrained therein in opposite directions while inhibiting erosion of the wall of the conduits carrying said main stream comprising a tubular T-joint having a stem portion for receiving said main stream and a cross bar portion extending to the right and to the left of said stem portion, means operable to direct the main stream passing through said stem portion into the right side of said cross bar portion including a first nozzle operable to inject a jet of fluid from the left corner of said T-joint into the juncture area thereof in a direction diagonally across said area, a second nozzle operable to inject a jet of fluid into said juncture area from a point on the left side of said cross bar portion opposite to the injection point of said first nozzle at an acute angle relative to said cross bar portion in the direction toward the right side thereof, and a third nozzle operable to inject a jet of fluid into the juncture area of said T-joint from a point of said cross bar portion in the region of its intersection with the center axis of said stem portion in the same direction as, but at a blunter angle relative to said cross bar portion than said second nozzle, and means operable to direct said main stream into the left side of said cross bar portion including a fourth nozzle operable to inject a jet of fluid from the right corner of said T-joint into the juncture area thereof in a direction diagonally of said area, a fifth nozzle operable to inject a jet of fluid from a point at the right side of said cross bar portion opposite the injection point of said fourth nozzle at an acute angle to said cross bar portion in the direction toward the left side thereof, and a sixth nozzle operable to inject a jet of fluid into the juncture area of said T-joint from a point of said cross bar portion in the region of its intersection with the center axis of said stem portion in the same direction as, but at a blunter angle relative to said cross bar portion than, said fifth nozzle.

References Cited in the file of this patent

UNITED STATES PATENTS

| | | |
|---|---|---|
| 584,968 | Taylor | June 22, 1897 |
| 610,066 | Kuser | Aug. 30, 1898 |
| 2,213,121 | Davy | Aug. 27, 1940 |
| 2,350,759 | Hilmer | June 6, 1944 |
| 2,889,856 | Magnuson | June 9, 1959 |

FOREIGN PATENTS

| | | |
|---|---|---|
| 466,191 | Great Britain | May 24, 1937 |